(No Model.)

O. W. BEACH.
VEHICLE AXLE.

No. 483,975. Patented Oct. 4, 1892.

Witnesses
B. S. Ober
W. S. Duvall

Inventor
Oscar W. Beach,
By his Attorneys,
C. A. Snow & Co.

UNITED STATES PATENT OFFICE.

OSCAR W. BEACH, OF SOUTH RIVERSIDE, CALIFORNIA, ASSIGNOR TO JAMES P. CURRY, OF FORT MORGAN, COLORADO.

VEHICLE-AXLE.

SPECIFICATION forming part of Letters Patent No. 483,975, dated October 4, 1892.

Application filed November 19, 1891. Serial No. 412,392. (No model.)

*To all whom it may concern:*

Be it known that I, OSCAR W. BEACH, a citizen of the United States, residing at South Riverside, in the county of San Bernardino and State of California, have invented a new and useful Vehicle-Axle, of which the following is a specification.

This invention relates to improvements in vehicle-axles and has special reference to an improvement upon United States Patent No. 446,416, granted me February 17, 1891.

My improvement has for its object, first, to reduce the cost of manufacture of the axle and sleeve by avoiding the presence of a square socket at the inner end of the sleeve and substituting therefor a more cheaply-formed cavity, and, second, to provide for a more secure maintenance of the sleeve upon the axle and for the obviation of looseness between the sleeve, axle, and axle-bed as caused by shrinkage of the latter.

With these objects in view the invention consists in certain features of construction hereinafter specified, and particularly pointed out in the claim.

Figure 1:
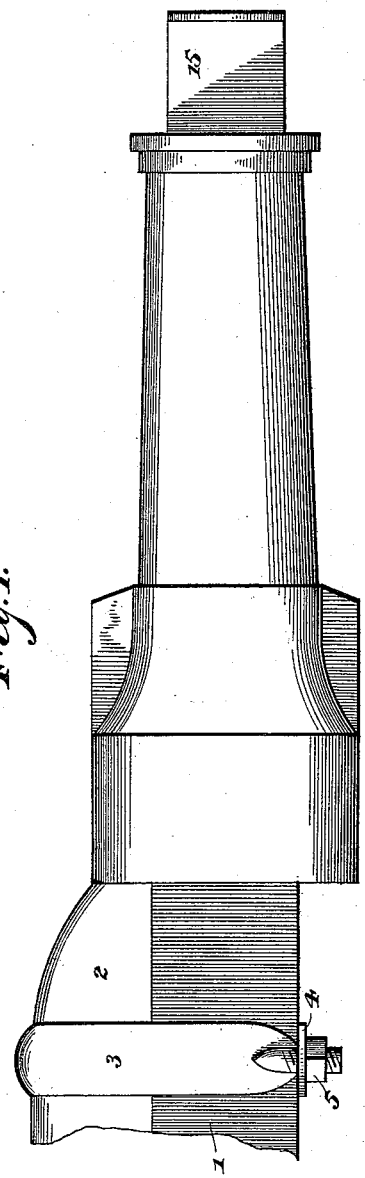
Figure 2:
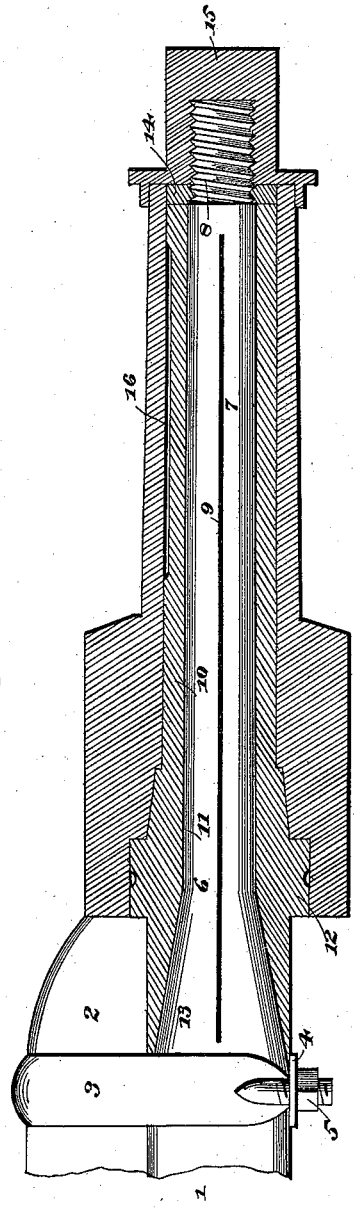

Referring to the drawings, Figure 1 is a side elevation of one end of an axle constructed in accordance with my invention. Fig. 2 is a longitudinal section of the axle.

Like numerals of reference indicate like parts in all the figures of the drawings.

1 designates the axle; 2, the axle-bed; 3, the clip for confining the two together; 4, the tie-plate, and 5 the nut connected to the clip and binding the tie-plate, axle, and axle-bed together. The axle is gradually and cylindrically reduced, as at 6, and merges into the plain bearing end or spindle 7, the extremity of which is threaded, as at 8, in rear of which the spindle is longitudinally slotted, as at 9, to form an air vent or passage whereby said axle is prevented from becoming superheated.

10 designates the sleeve, the interior of which is bored to fit the plain and conical or reduced portion of the spindle, and is therefore provided with the plain bore 11, which extends from its front end to a point opposite its external annular collar 12 and from there on is made conical, forming the socket 13, adapted to fit snugly over the reduced portion 6 of the spindle. When placed in position upon the spindle, it is held in position by its frictional contact therewith, which friction is increased and maintained by the presence of a nut 14, threaded on the end of the spindle, bearing against the outer end of the sleeve and forcing the latter inwardly. A second external nut 15 is also employed, as is usual, for the purpose of locking the wheel upon the sleeve. As before indicated, the sleeve is provided with the usual collar 12, and may also be provided with the oil-groove 16.

In view of the foregoing description, therefore, it will be seen that I substitute in my invention the conical, plain, or cylindrical socket for the heretofore-employed squared or angular socket, and that by such substitution, while not impairing the practicability or efficiency of the device, I reduce its cost of manufacture. Furthermore, the employment of the nut 14 for increasing the binding frictional contact between the sleeve and spindle will be found decidedly cheap as well as efficacious.

Having described my invention, what I claim is—

The combination, with an axle-skein consisting of the reduced conical and straight bearing portions 6 and 7, respectively, the latter being threaded at its outer extremity, of the axle-sleeve internally bored to fit the skein and therefore having the plain bore 11 and rear conical bore 13 and having the external annular shoulder 12, the axle-bed, the clip embracing the same and the rear end of the axle-sleeve, which latter terminates between the axle and bed, the inner nut 14, threaded on the end 8 of the axle, bearing against the outer end of the axle-sleeve, agreeing with it in diameter and pressing its interconical bore against the conical rear portion of the axle, the hub-sleeve mounted on the axle-sleeve and at its front end inclosing the inner nut and having rear internal shoulders bearing against the external annular shoulder formed on the axle-sleeve, and the external nut or cap fitting over the outer end of the axle, embracing the hub-sleeve and bearing against the inner nut, substantially as specified.

In testimony that I claim the foregoing as my own I have hereto affixed my signature in the presence of two witnesses.

OSCAR W. BEACH.

Witnesses:
OREGON A. ARBORN,
JOHN H. BALDWIN.